United States Patent [19]

Murakami

[11] 3,938,637
[45] Feb. 17, 1976

[54] CONTROL SYSTEM FOR FORWARD-REVERSE CLUTCHES AND LOW PRESSURE SUPPLY LINE

[75] Inventor: Kiyoharu Murakami, Neyagawa, Japan

[73] Assignee: Kabushiki Kaisha Daikin Seisakusho, Osaka, Japan

[22] Filed: Feb. 21, 1975

[21] Appl. No.: 551,987

[30] Foreign Application Priority Data

Mar. 19, 1974 Japan.............................. 49-31816

[52] U.S. Cl....... 192/113 R; 192/113 B; 192/87.19; 192/109 F; 137/625.23
[51] Int. Cl.²......................................... F16D 25/10
[58] Field of Search......... 192/113 R, 113 B, 87.18, 192/87.19, 109 F

[56] References Cited
UNITED STATES PATENTS

| | | | |
|---|---|---|---|
| 3,391,767 | 7/1968 | Stow ................................ | 192/87.19 |
| 3,752,281 | 8/1973 | Arnold ............................ | 192/109 F |
| 3,823,801 | 7/1974 | Arnold ............................ | 192/109 F |
| 3,872,957 | 3/1975 | Maurer et al. ................... | 192/113 B |

Primary Examiner—Benjamin W. Wyche
Attorney, Agent, or Firm—Pierce, Scheffler & Parker

[57] ABSTRACT

A vehicle or vessel having a forward and rearward clutch has, according to the invention, a single lever clutch control system whereby an operator may select a forward or rearward clutch and, simultaneously "inch" the vehicle or vessel using one and the same control lever.

4 Claims, 6 Drawing Figures

CONTROL SYSTEM FOR FORWARD-REVERSE CLUTCHES AND LOW PRESSURE SUPPLY LINE

The present invention relates to a single lever clutch control system which is applicable to vehicles or vessels which are provided with a forward and a rearward clutch.

According to the invention, an operator can select the forward clutch or rearward clutch using a single lever, while he can also inch the vehicle or vessel using the same lever at the same time.

In the prior art clutch control system for vehicles or vessels, two levers have generally been installed, i.e., one for selecting forward and rearward motion, and the other for inching or trolling. For example, a prior system comprised a pressure-regulating piston valve in a fluid passageway connecting a select valve and a forward and a rearward clutch. The piston valve was biased by a compression spring against the fluid pressure applied on the valve surface of the piston valve. For increasing the setting force (or the strength of the spring force) soon after the selecting operation, there was provided another piston on which another end of the spring seated and a corresponding cylinder of said piston was in communication with the pressure-regulating chamber of the select valve by means of a fluid passageway with an orifice. Following the selecting operation, working fluid in the regulating chamber was introduced in the cylinder through the orifice, and the pressure of the chamber was set in an arranged period of time. According to the prior system, the inching manner was not manually controlled in connection with the position of the select lever (in other words, only the inching period or speed was set in connection with the position of the select valve). Therefore, the operator was not able either to extend or to shorten the half-engaged condition or regulated condition of the clutches. Since an operational skill was required, an additional trolling valve was necessary. In that case, the system and operation become complicated, in that two levers, i.e., a forward-rearward selecting lever and an inching lever, were involved. Furthermore, according to the prior system, the fluid pressure was raised relatively quickly up to a pre-determined value necessary for lubrication soon after either clutch was selected, thus causing an undesirable jerk or shock to passengers.

It is a principal object of the present invention to provide a forward-rearward selecting system which is operated manually and in a controlled manner by only a single selecting lever.

A second object of the invention is to provide a single lever clutch control system which is not only simple in interlocking mechanism but also easy to operate by one who is without any special skill.

A third object of the invention is to provide a single lever clutch control system which decreases power consumption. The invention ensures long life of the oil pump of the system.

A fourth object of the invention is to provide a single level clutch control system which prevents undesirable jerk in the selecting operation.

These and other objects and advantages will be apparent from the following detailed description when read in conjunction with the accompanying drawings, wherein.

Figure 1:
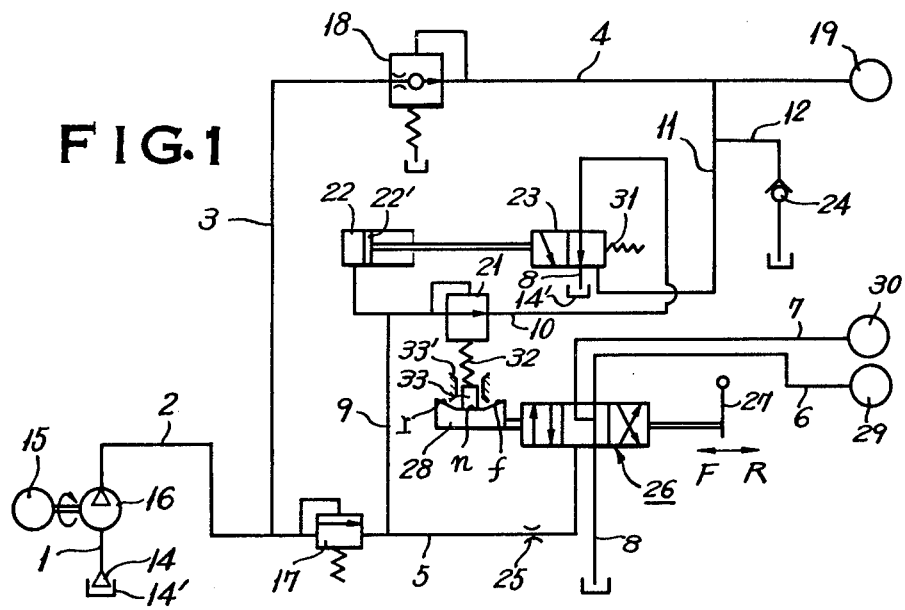
FIG. 1 is a diagrammatic showing of one embodiment of the present invention in the neutral condition.
Figure 2:
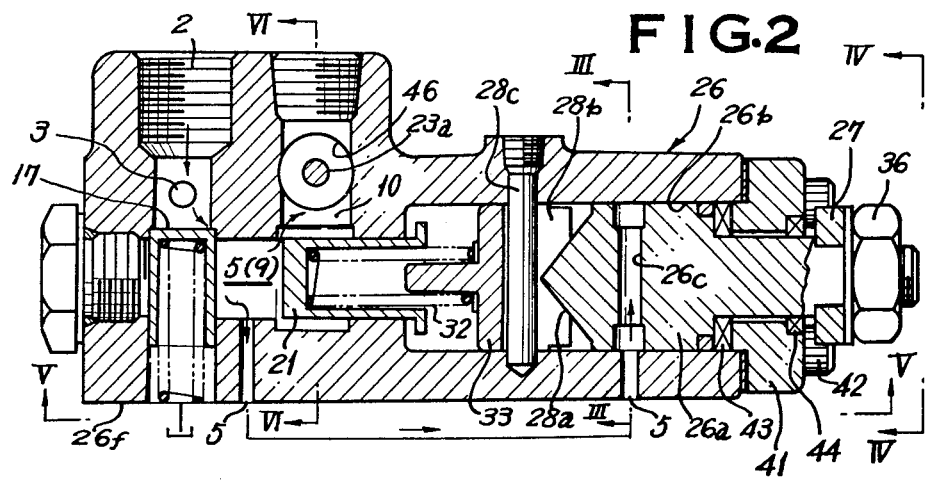
FIG. 2 is a central sectional and elevational view of another embodiment of the present invention incorporating a forward-rearward rotary select valve.
Figure 3:
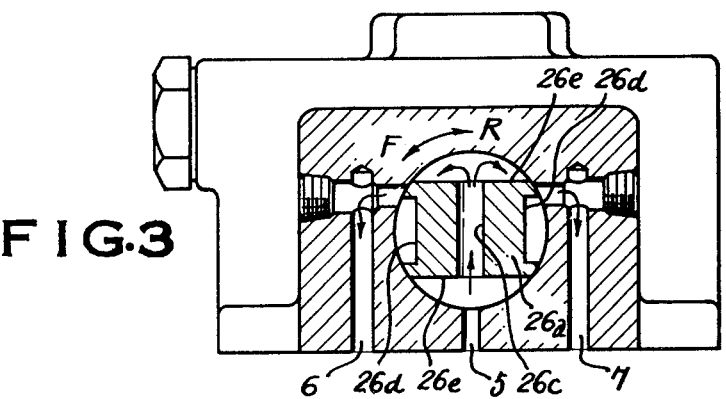
FIG. 3 is a sectional view taken along the line III—III in FIG. 2 looking in the direction indicated by the arrows.

Referring now to FIG. 1, the system is composed of various elements, i.e., fluid passageways 1 through 12; a strainer 14 in a fluid (oil) tank 14'; an engine 15; an oil pump 16 which is driven by the engine 15; a pressure preserve valve 17 which places fluid passageway 2 in communication with fluid passageway 5 when fluid pressure in the passageway 2 increases beyond a pre-determined value, for example 3 kg/cm$^2$, so as to maintain the minimum pressure for lubrication; a one-way control valve 18 which connects two passageways 3, 4 through an interior orifice as shown when the pressure in passageway 3 is higher than that in passageway 4, but disconnects both passageways 3, 4 when the pressure in passageway 4 increases beyond the pressure in passageway 3 so that exhaust oil poured in passageway 4 from a passageway 11 is used for lubrication effectively, as is to be clearly explained later; and lubricating parts 19 such as bearings, torque converters and so on.

While oil pump 16 is driven by the engine 15, oil in the tank 14' is introduced in pump 16 through passageway 1, compressed and forced in passageway 2. The oil pressure in passageway 2 is regulated at sufficient value for lubrication, by valve 17, and the regulated oil is supplied to lubricating parts 19 through passageways 3, 4; and one-way control valve 18.

Numeral 21 indicates an inching valve (pressure regulating main valve) which connects two passageways 9, 10 when the pressure in passageway 9 increases beyond a value corresponding to the setting load of a spring 32, which load is adapted to vary according to the position of a select lever 27. Numeral 22 indicates a piston actuator which is composed of a cylinder where passageway 9 opens, and a piston 22' slidably inserted in the cylinder and connected to a drain valve 23 so as to place the drain passageway 10 with a passageway 11 when oil pressure in passageways 5, 9 increases beyond a value pre-determined by a spring 31, so sufficient that either clutch 29 or 30 is maintained in stable engaged state. 24 indicates an escape valve which prevents excessive oil pressure in lubrication passageways 4, 11, 12.

The system includes other elements such as a nozzle (or throttle) 25, a forward-rearward select (switch) valve 26, a select lever 27, a direction converter 28 which is attached to valve 26 to be shifted in unison, and a forward and a rearward clutch 29, 30.

In FIG. 1, the spring 32 seats on the upper end of a follower 33 which, in turn, abuts neutral cam "n" formed on direction converter 28. The distance between the cam n and valve 21 is determined so far as to locate the arrow in valve 21 in line with passageway 10 when spring 32 extends to its unloaded state; thus, the valve 21 forms an almost free passageway. Therefore, under the neutral state as shown in FIG. 1, oil in passageway 9 flows freely toward passageway 10 through the valve 21. Follower 33 is slidably supported by a cylindrical guide 33'. Formed at both sides of cam n are cams, identified "*f*" and "*r*", for forward and rearward pressure setting respectively. The cams *f, r* are tapered in the manner that they approach valve 21 as they extend from the neutral cam *n*.

The direction converter 28 is shown fixed to the select valve 26 so that they move together along the arrows "F" and "R". When valve 21 is manually shifted in either of the directions F and R, follower 33 is gradually lifted by either cam of *f* and *r*, the lift of follower 33 being determined corresponding to the extent to which valve 26 moves. Due to the elevation of follower 33, spring 32 is compressed to increase the setting value of valve 21, i.e., the arrow illustrated in the valve 21 rises: this means that the pressure in passageway 9 is maintained at a higher value which corresponds to the shift of select lever 27. If the pressure exceeds the regulated setting value, valve 21 connects passageways 9, 10 gradually to decrease the excessive pressure.

In the illustrated neutral state, oil which passes through valve 17 is drained through passageway 9, main valve 21 (setting pressure being quite low because it is in neutral state), passageway 10 and drain valve 23, which latter is set as shown under the influence of setting spring 31 to connect passageway 10 to tank 14' through drain passageway 8.

When select lever 27 is shifted to the left (forward) or to the right (rearward) together with select valve 26, passageway 5 is placed in communication with either passageway 6 (connected to forward clutch 29) or passageway 7 (connected to rearward clutch 30). At the same time, pressure-regulating spring 32 in valve 21 is compressed due to the rising cam profile *f* or *r* formed on the direction converter 28: thus, the oil which formerly passed inching valve 21 freely, is gradually restricted and increased in its pressure. So raised in pressure, the oil is supplied to either of forward and rearward clutches 29, 30 through passageway 5, orifice 25, select valve 26, and either of passageways 6, 7. The degree of clutch engagement is determined in proportion to the travel stroke of select lever 27.

On the other hand, when the pressure in passageway 9 increases to the aforementioned value, piston 22' in actuator 22 overcomes spring 31 installed in drain valve 23; thus, passageway 10, which formerly was drained, is placed in communication with passageway 11 and oil in passageways 11, 4 is supplied to lubricating parts 19.

As was explained hereinbefore, when the pressure in passageways 4, 11 increases beyond the setting value of control valve 18, valve 18 is closed due to the pressure acting from the down stream, whereupon lubricating oil is supplied only from passageway 11 thereby saving the power of engine 15, in that the exhaust oil pressure is used effectively. Excessive pressure is decreased by escape valve 24 the setting pressure of which is regulated to be higher than that of control valve 18.

When select lever 27 reaches its terminal point in the forward or rearward stroke, oil pressure applied to either oil clutch reaches maximum value. On the contrary, as an operator shifts lever 27 from the terminal point toward neutral position, oil pressure in either of passageways 6, 7, decreases in proportion to the extent of shift of select lever 27. Thus the clutch in question is gradually disengaged and drain valve 23 switches passageway 10 from passageway 11 to drain tank 14' as illustrated when oil pressure decreases below the certain value. When valve 26 returns to the illustrated neutral state, the clutch is fully disengaged.

In the illustrated example, the select lever 27 is shown as shiftable bilaterally for explanation's sake. It may, however, be replaced by a rotary select lever. In that case, a mechanism is required in which rotary movement of the select lever is converted into linear movement. For that purpose, a cylindrical cam interconnecting the lever and select valve 26 is applicable as well as a rotary valve in place of select valve 26.

According to the present invention, following advantages are to be expected:

1. Since inching is performed with interlocked forward-rearward select lever 27, there is no need to provide two levers. That is, only a common single lever functions well as former select lever and inching lever. Therefore, the mechanism is simple and involves low cost especially in application to remote control linkage mechanisms.

2. Stable inching operation is enjoyed in proportion to the speed and position of select lever 27. Therefore, the period for half clutch engagement is suitably shortened in connection with the load, speed and other surrounding conditions, thus decreasing unnecessary abrasion and temperature rise of the clutch facing so as to ensure its long life.

3. Power or fuel consumption is maintained at low value because pressure preserve valve 17 keeps minimum lubricating pressure in the passageway 3, even in the neutral state when oil in passageay 9 is drained unconditionally through inching valve 21 and drain valve 23; and in the forward or rearward state, exhaust surplus oil in the passageway 10 is switched to passageway 11 by drain valve 23 for use at lubricating parts; and oil supply from control valve 18 is reduced when the oil pressure in passageway 4 increases beyond a certain value. Oil pump 16 enjoys long life maintaining oil temperature at low level in that the system requires low pressure in the neutral state. When the vehicle starts operation and oil pressure in passageway 9 exceeds the pre-determined value, passageways 10, 11 are placed in communication automatically, thereby increasing the lubricant to depress the temperature rise and to protect lubricating parts 19. Therefore, according to the present invention, the device is ensured long life.

4. In the clutch engaging process, since the oil pressure increases from zero or nearly zero, smooth engagement is attained. In the prior system, the clutch was supplied with oil at relatively high pressure, equal to that supplied to lubricating part, soon after the select valve was shifted. Therefore unpleasant jerk or shock was inevitable in the past.

Figure 4:
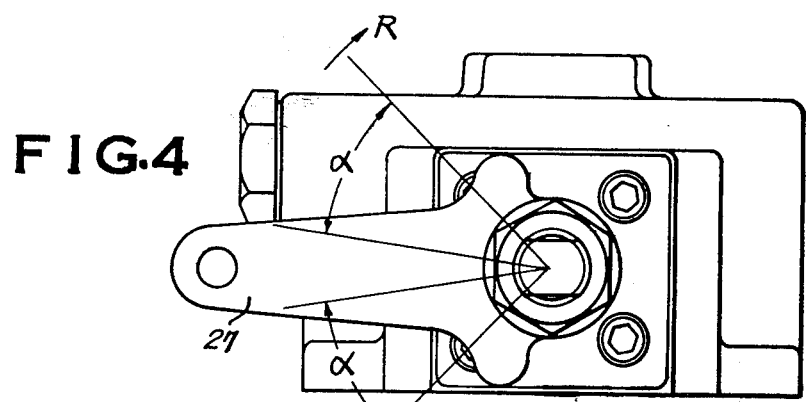
FIGS. 4 and 5 are end views taken along the lines IV—IV and V—V in FIG. 2, respectively.

FIGS. 2 through 6 illustrate another embodiment which incorporates a rotary select valve. Similar characters of reference indicate similar parts in the several figures of the drawing. Select lever 27 (FIG. 2) is attached at the righthand end of rotary valve 26*a* by a nut 36. The rotary valve 26*a* is snugly inserted in cylindrical surface 26*b* of valve body 26 and is provided with a passageway 26*c*, a tangential groove 26*e* (FIG. 3) connected to both ends of passageway 26*c*, and two peripheral grooves 26*d*. When the valve 26*a* is rotated in either a forward or rearward direction, passageway 5 is placed in communication with passageway 6 leading to forward clutch, or with passageway 7 leading to rearward clutch 7, respectively. Circumferential length of each groove 26*d* determines the lever angle α (FIG. 4)

in which passageways 5, 6 or passageways 5, 7 are connected, respectively. A cover 41 is attached at an open end of valve body 26 by four bolts 42. Numerals 43, 44 indicate oil seals.

Figure 5:
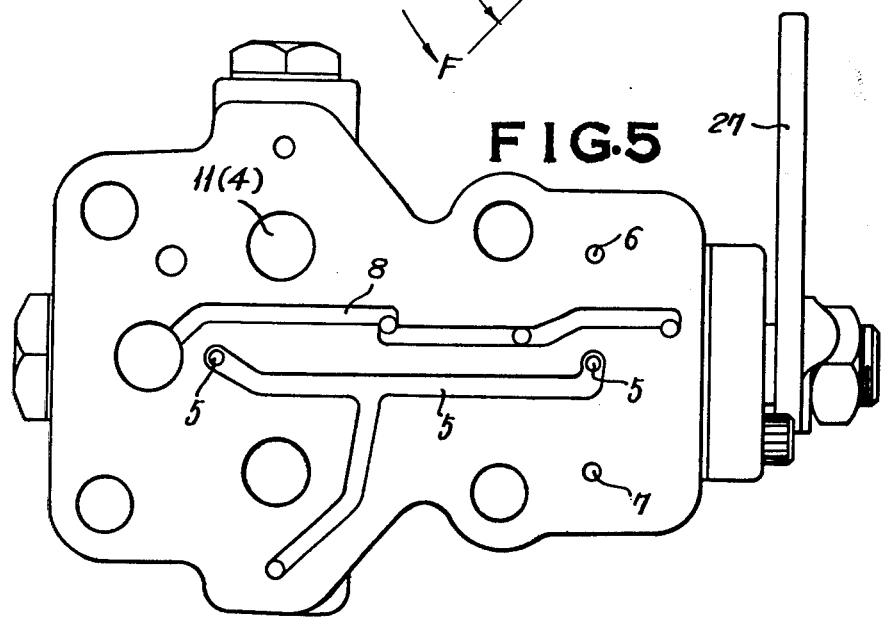
Figure 6:
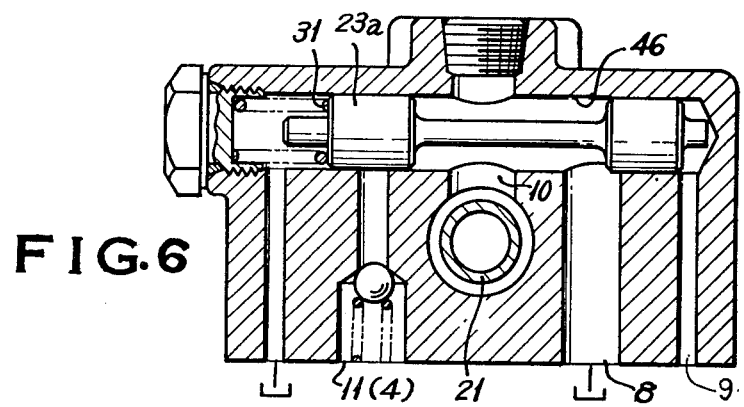
FIG. 6 is a sectional view taken along the line VI—VI in FIG. 2.

Rotary valve 26a is provided with a cam 28a in the shape of a quadranglar pyramid which engages in an indented cam surface 28b with a V-section formed on the righthand end of a follower 33: thus, follower 33 is pushed to the left when the select lever 27 is rotated in either direction from the illustrated netural state, in proportion to the rotation angle, thereby compressing spring 32 to gradually increase the setting force of inching valve 21. A guide pin 28c engages in a groove with a U-section formed in the follower 33 at the bottom of its cam surface 28b, which pin prevents follower 33 from rotation when sliding axially. Since valve body 26 is fixed on a base element, such as a control panel (not shown), and bottom surface 26f contacts with the corresponding surface of the base element in a watertight relationship, only main passageway 5 and drain passageway 8 are formed therebetween as shown in FIG. 5.

Pressurized oil is first introduced in passageway 2 (FIG. 2), and is forwarded to the necessary lubricating parts through passageway 3 under the aforementioned minimum pressure. When the pressure in passageway 2 increases beyond the minimum value, pressure preserve valve 17 opens to introduce oil into passageway 5 (9) part of which oil is sent to either of forward or rearward clutch through select valve portion shown in FIG. 3 under the aforementioned pressure which is determined by the action of inching valve 21 so as to increase in proportion to the extent of operation of select lever 27 (i.e., the rotation angle from the neutral position as shown in FIG. 4). When the oil pressure in passageways 5, 9 rises to the setting value, a drain spool 23a (FIG. 6) in a cylinder 46 moves to the left against the resistance of compression spring 31; thus, the passageway 10 is switched from drain passageway 8 to passageway 11 (4) to supply surplus oil to lubricating parts.

I claim:

1. For use in a vehicle or a vessel having a fluid-actuated forward clutch and a rearward clutch, a source of fluid under pressure, and a forward-rearward select valve therebetween, the combination of single lever clutch control system for selectively controlling actuation of the clutch comprising:

a pressure preserve valve (17);
   a first passageway (2) between said source of pressurized fluid and said valve (17);
   a second passageway (5) between said valve (17) and said select valve (26);
   a one-way control valve (18);
   a third passageway (3) between said passageway (2) and said valve (18);
   a fourth passageway (4) between valve (18) and lubricating parts (19);
   an inching valve (21) the setting pressure of which is regulated in proportion to the extent of action of select valve (26);
   a fifth passageway (9) between passageway (5) and inching valve (21):
   a drain valve (23);
   a sixth passageway (10) between inching valve (21) and drain valve (23); and
   a seventh passageway (11) between drain valve (23) and said fourth passageway (4); said drain valve (23) being adapted to place said sixth passageway (10) in communication with said seventh passageway (11) when the fluid pressure in fifth passageway (9) increases beyond a pre-determined value whereby inching valve (21) and select valve (26) are operated by a single select lever (27).

2. A single lever clutch control system as defined in claim 1, wherein said inching valve (21) is provided with a setting spring (32) which abuts by way of a follower (33) on a direction converter (28) interlocked to the select valve (26), said direction converter (28) being provided with a cam (*n*, 28*b*) for neutral and two cams (*f, r* or 28*a*) for forward inching and rearward inching.

3. A single lever clutch control system as defined in claim 1, wherein the setting pressure of said pressure preserve valve (17) is set as a minimum value for lubrication.

4. A single lever clutch control system as defined in claim 1, wherein the setting pressure of said inching valve (21) increases from approximately zero level in proportion to the actuation extent of select valve (26) scaled from neutral position.

* * * * *